United States Patent [19]

Cross et al.

[11] 4,096,235
[45] Jun. 20, 1978

[54] PROCESS OF PRODUCING MAGNESIA WITH SULFURIC ACID RECYCLE

[75] Inventors: Harry Edward Cross, Johannesburg, South Africa; Wolfgang Krieger, Oberursel, Germany; Eberhard Anschutz, Frankfurt am Main, Germany; Lothar Reh, Bergen-Enkheim, Germany; Martin Hirsch, Frankfurt am Main, Germany

[73] Assignee: Metallgesellschaft Aktiengesellschaft, Frankfurt am Main, Germany

[21] Appl. No.: 731,890

[22] Filed: Oct. 13, 1976

Related U.S. Application Data

[63] Continuation of Ser. No. 545,660, Jan. 30, 1975, abandoned.

[30] Foreign Application Priority Data

Feb. 21, 1974 Germany .............................. 2408308

[51] Int. Cl.² .............................................. C01F 5/12
[52] U.S. Cl. ..................................... 423/166; 423/638
[58] Field of Search ............... 423/166, 554, 542, 636, 423/522, 638, 541

[56] References Cited

U.S. PATENT DOCUMENTS 3,579,616  5/1971  Reh et al. ................................. 34/10

FOREIGN PATENT DOCUMENTS 2,159,973  6/1972  Germany.

*Primary Examiner*—O. R. Vertiz
*Assistant Examiner*—Wayne A. Langel
*Attorney, Agent, or Firm*—Burgess, Dinklage & Sprung

[57] ABSTRACT

This invention relates to a process of producing magnesia from magnesium-containing carbonate ores, which comprises leaching with sulfuric acid, subsequently neutralizing the solution with magnesia, separating the undissolved impurities, crystallizing magnesium sulfate under pressure and above 150° C so the crystals have from 1.5 to 4 moles of water per magnesium sulfate molecule and thermally decomposing the latter to form magnesia and $SO_2$, recovering sulfuric acid from the sulfur dioxide produced in the decomposing steps and recycling the sulfuric acid to the leaching stage.

5 Claims, 1 Drawing Figure

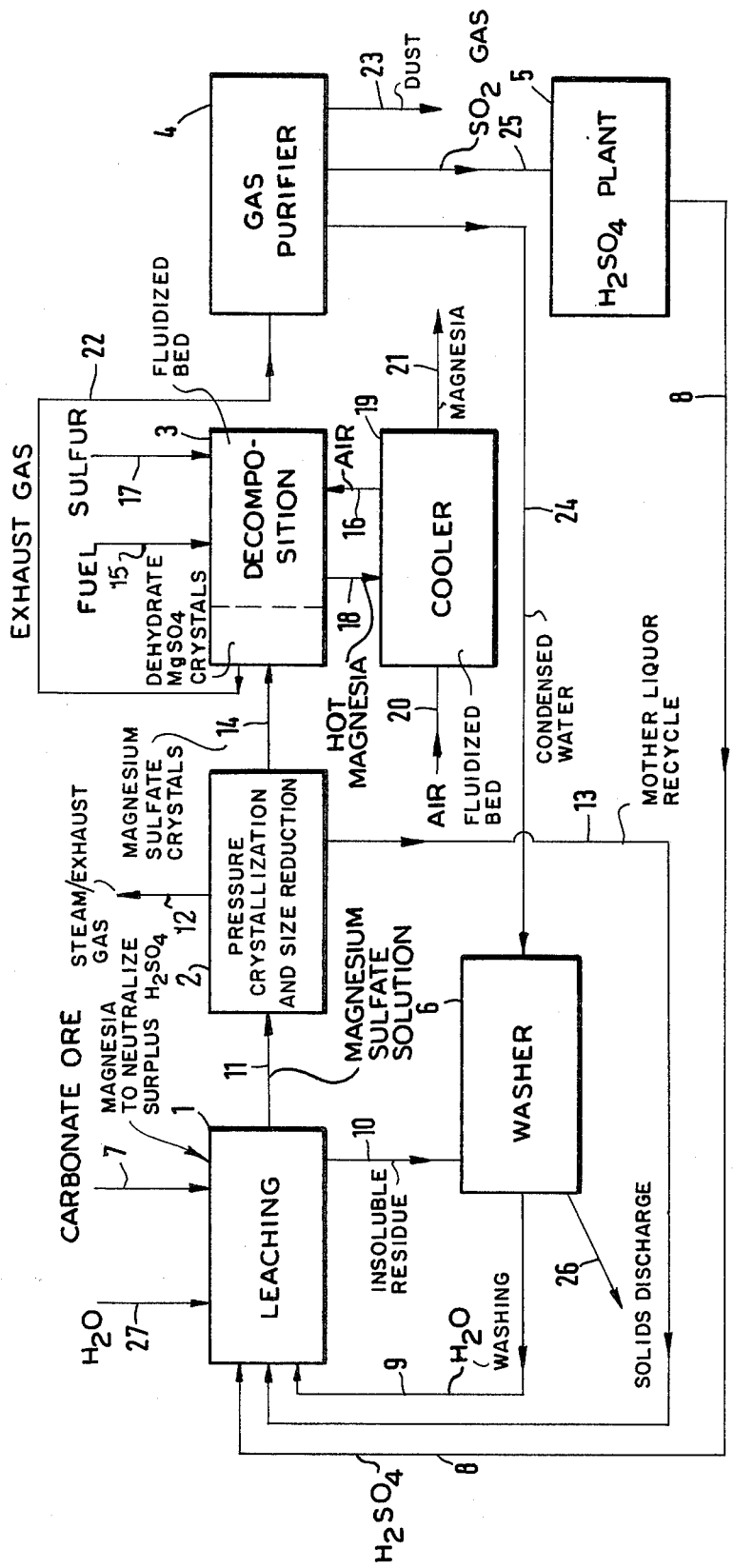

PROCESS OF PRODUCING MAGNESIA WITH SULFURIC ACID RECYCLE

This application is a continuation of U.S. application Ser. No. 545,660 filed Jan. 30, 1975, and now abandoned.

BACKGROUND

This invention relates to a process of producing magnesia from magnesium-containing carbonate ores, which comprises leaching with sulfuric acid, subsequently neutralizing the solution with magnesia, separating the undissolved impurities, crystallizing magnesium sulfate and thermally decomposing the latter to form magnesia and $SO_2$, recovering sulfuric acid from the sulfur dioxide produced in the decomposing step and recycling the sulfuric acid to the leaching stage.

The magnesium chloride contained in sea water has mainly been used as a source of high-purity magnesia. An increase in concentration is succeeded by a thermal decomposing, which may be carried out, e.g., in accordance with German Patent 878,801 and results in a formation of magnesia and hydrogen chloride gas. This practice has the disadvantage that the resulting oxide has a purity of about 97% and is contaminated with boron compounds. A further disadvantage resides in the consumption of large quantities of energy required to increase the concentration of the originally highly dilute solution.

Another process of producing magnesia relies on the large deposits of carbonate ores. According to the U.S. Pat. No. 2,381,053, these ores are ground and in an aqueous medium are treated first with sulfur dioxide and then with air. This results in a formation of magnesium sulfite as an intermediate product and then of magnesium sulfate, which is filtered from solid residues and is concentrated by evaporation and finally thermally decomposed. The sulfur dioxide formed in the decomposing step is recycled to the first treating stage. This practice has the important disadvantage that the treatment with sulfur dioxide and the subsequent treatment with air result in solid-gas reactions which are relatively slow and require a high surplus of reactants, particularly in the second stage.

Another process has been proposed which also relies on magnesium-containing carbonate ores and in which the ores are leached in a surplus of hot sulfuric acid until the magnesium sulfate concentration exceeds 60% of the saturation concentration, free acid is neutralized with magnesia, the solid residues are separated, and magnesium sulfate is crystallized and is finally thermally decomposed (DOS 2,159,973). Sulfuric acid can be recovered from the gas produced by decomposing and may be re-used for leaching.

Whereas this process has considerable advantages compared to the one mentioned before, particularly because a much higher reaction rate is achieved during leaching, the further processing of the magnesium sulfate solution requires a multistep heat treatment, for instance by spray drying, final drying, and decomposing or by crystallization, drying, and decomposing. Besides, large quantities of dust which can be separated only with difficulty are formed by the thermal decomposing of magnesium sulfate from which all water has been removed. Moreover, only a rotary kiln has been described as a decomposing unit and has a low throughput rate per unit of the reactor volume and owing to the dissipation of radiant heat has a poor thermal efficiency.

SUMMARY

This invention provides a process which is free of the disadvantages of the known processes, has a high throughput rate and can be carried out in a particularly simple manner and with a high heat economy yielding a pure product of uniform quality.

Magnesia is produced according to the invention from magnesium containing ores by a process which includes the following steps:

(a) leaching said ore with sulfuric acid;

(b) neutralizing the solution from (a) with magnesia and separating undissolved impurities;

(c) crystallizing magnesium sulfate from the solution from (b) under superatmospheric pressure and at temperatures above 150° C (d) forming magnesium sulfate crystals containing 1.5–4 mols of water of crystallization and having a fineness suitable for decomposition in a fluidized bed reactor;

(e) dehydrating and/or heating the crystals from (d) in a suspension-type heat-exchanger operated with exhaust gases from the fluidized-bed reactor;

(f) feeding the crystals from (e) after separation to the fluidized bed reactor where it is decomposed to form magnesia and sulfur dioxide, the heat required for the decomposition reaction being generated by approximately a stoichiometric combustion of fuel charged into the fluidized bed reactor;

(g) removing magnesia from the fluidized-bed reactor feeding same to a multi-stage fluidized-bed cooler operated with air as a fluidizing gas;

(h) feeding fluidized air from the fluidized bed cooler to the fluidized bed reactor of step (f);

(i) converting the sulfur dioxide produced in step (f) into sulfuric acid and recycling same to leaching step (a).

DESCRIPTION OF THE DRAWING

The accompanying drawing is a simplified flow diagram for carrying out the process of the invention.

DESCRIPTION

Crystallization under a superatmospheric pressure and at temperatures above 150° C is known to afford the advantage that a magnesium sulfate is formed which has a low content of water of crystallization.

The subsequent separation of the crystals from the mother liquor should be effected in such a manner that the subsequent cooling of the crystals results in a magnesium sulfate containing 1.5–4 moles of water of crystallization. As the crystals are cooled, the magnesium sulfate is known to take up any water which is present until an equilibrium has been reached between the saturated solution and the undissolved solids at the existing temperature. To inhibit during this cooling the formation of a sulfate having more than 4 moles water of crystallization, care must be taken during the separation of the crystals that the quantity of mechanically adhering mother liquor does not exceed the largest quantity which is permissible for the formation of a hydrate which contains 4 moles of water of crystallization. On the other hand, when the magnesium sulfate crystallizes as the monohydrate, the mother liquor must not be removed to such an extent that less water is available than is required to form a hydrate which contains at least 1.5 moles of water.

The separation of the crystals from the mother liquor may be effected under normal pressure. The methods of separation used for this purpose should suitably ensure a fast separation between the solids and the solution so that the formation of a salt having an excessively high content of water of crystallization or a redissolution of the previously crystallized magnesium sulfate is avoided. It will be particularly desirable to separate the crystals from the mother liquor under pressure and particurlarly to use for this purpose the pressure which prevails during the crystallization.

The crystals which have been separated from the mother liquor are desirably cooled in such a manner that a friable product is obtained. Cooling rolls or cooling belts are particularly suitable for this purpose.

The main reason for the performance of the crystallization, separation of crystals, and cooling of crystals under carefully controlled conditions resides in the surprising fact that a magnesium sulfate which has 1.5-4 moles of water of crystallization has excellent mechanical properties for the further processing, which comprises dewatering and/or heating in suspension-type-heat exchangers and decomposing in a fluidized bed. The solids remain granular and flowable and the particles exhibit virtually no tendency to disintegrate and form dust.

The cooled magnesium sulfate should generally disintegrated to the fineness required for the fluidized-bed decomposing. This disintegration is suitably accomplished in hammer mills, impact mills or pinned disc attrition mills. The magnesium sulfate is then charged into a suspension-type, heat-exchanger, which is fed with the exhaust gases from the fluidized bed reactor and in which the magnesium sulfate is dewatered and/or pre-heated in conjunction with a cooling of the gases and through a separator is fed to the fluidized-bed reactor, which is operated at a temperature of about 900°-1200° C.

The solids then enter a fluidized-bed cooler, which comprises a plurality of separate cooling stages flown through in succession. In that cooler, the solids deliver heat in steps to the fluidizing air, which is thus heated. The heated air is then fed to the fluidized-bed reactor, where the heat content of the air is utilized in the decomposition step.

The heat required for the decomposition step is generated by an approximately stoichiometric combustion of fuel charged into the fluidized-bed reactor. The term "approximately stoichiometric" means that there should be no or only a slight excess of air.

The fuel may consist of the conventional fuel oil and/or fuel gas as well as of high-sulfur fuel oils and sulfur-containing distillation residues, i.e., products or waste materials which can otherwise be processed only with difficulty. Contrary to expectations it has been found that the sulfur-containing impurities of these fuels do not contaminate the product but enter the gas phase as sulfur dioxide.

Particularly owing to the approximately stoichiometric combustion and the heat economy (recycling of heat to the decomposition step) the exhaust gas produced in the decomposing step has a high concentration of sulfur dioxide.

In a preferred embodiment of the invention, the magnesium sulfate is decomposed in an expanded fluidized bed having a mean fractional voidage of $\epsilon > 0.7$, the solids are separated in a recycling cyclone and a major portion of the solids are recycled into the fluidized-bed reactor. For this purpose the fluidizing air is introduced into the fluidized-bed reactor at such a high velocity that the gases produced in the decomposing step and the solids form a highly expanded fluidized bed, in which the solids are highly agitated and all or a major portion of the solids are discharged with the gases. A major portion of the discharged solids are then recycled to the fluidized-bed reactor. The proportion of recycled solids may be selected so that the residence time is kept within the required range.

According to another desirable feature of the invention, the fluidized-bed reactor for decomposing the magnesium sulfate is supplied with part of the turbulencing air as secondary air above the inlet for the fluidizing air. In this embodiment the ratio of fluidizing air to secondary air should be in the range of approximately 1:2 to 5:1 and the fuel should be charged between the inlets for the fluidizing air and secondary air.

As a result of the supply of air in two component streams, the reactor volume is divided into a reducing lower zone disposed below the secondary air conduit and a neutral upper zone disposed over the secondary air conduit. The temperature in these zones is virtually the same owing to the intense circulation of solids in the fluidized-bed reactor. This practice affords the advantage that the decomposing takes place under reducing conditions, which are more favorable, and nevertheless the fuel is fully utilized as a result of the after-burning above the secondary air inlet.

In connection with decomposing reactions it is known to use an expanded fluidized bed, which is preceded by a suspension type-heat exchanger stage and succeeded by a fluidized-bed cooler. This practice is disclosed in U.S. Pat. No. 3,579,616.

Because certain sulfur losses are inevitable in the process, these losses are desirably compensated by the production of sulfur dioxide in the decomposing step. To this end, the rate at which sulfur dioxide is produced in the decomposing step should be sufficient for the production of the sulfuric acid required for leaching. If the conventional fuel oils and/or fuel gases are used as fuel or the waste fuel does not contain enough sulfur for the production of the additional sulfur dioxide required, additional elementary sulfur and/or hydrogen sulfide may be supplied.

The exhaust gas formed in the decomposing step is purified in conventional manner, e.g., by hot gas filters, by an electrostatic purification of gas, by Venturi-tube scrubbers, and by wet-type electrostatic precipitators for fine purification, and is then catalytically processed to form sulfuric acid.

The invention will be explained more fully and by way of example with reference to the flow scheme and the example.

The leaching stage 1 is supplied with magnesium-containing carbonate ore through conduit 7, sulfuric acid through conduit 8, and water through conduit 9 and, if desired, conduit 27. After the treatment has been carried out for a sufficiently long time and surplus sulfuric acid has been neutralized with magnesia, an insoluble residue is removed through conduit 10. The magnesium sulfate solution flows through conduit 11 to the pressure crystallisation unit 2, from which water vapor-laden exhaust gases are withdrawn through conduit 12. The mother liquor is filtered and then recycled through conduit 13 to the leaching stage 1. The cooled magnesium sulfate crystals contain 1.5-4 moles of water of crystallization and are disintegrated to the fineness required in a fluidized bed and in conduit 14 are then fed to the decomposing unit 3, which is fed with fuel oil through conduit 15, air through conduit 16, and elementary sulfur through conduit 17. The hot magnesia leaves the decomposing unit 3 through conduit 18 and in the fluidized-bed cooler 19 is cooled by a heat exchange with air supplied through conduit 20, and is discharged at 21. The heated air flows through the above-mentioned conduit 16 into the decomposing unit 3.

The exhaust gas which has been formed in the decomposing step and which is used for pre-dewatering and/or preheating is fed through conduit 22 to a gas purifier 4, in which water and dust are removed. Dust is discharged through conduit 23. The condensed water may contain small amounts of sulfuric acid and flows through conduit 24 first to the washing unit 6, in which the filter residue is washed, which has been withdrawn through conduit 10 from the leaching stage 1. The water is then recycled through 9 into the leaching stage 1. The washed filter residue is discharged through 26 and discarded.

The gas which contains sulfur cioxide is fed through 25 to the sulfuric acid-producing plant 5 and is converted therein into sulfuric acid, which is recycled through conduit 8 to the leaching stage 1.

EXAMPLE

The leaching stage 1 is fed through conduit 7 at a rate of 2.3 metric tons per hour with raw magnesite having the following composition by weight:
80% $MgCO_3$
4% $CaCO_3$
2% $Fe_2O_3$
14% acid-insoluble matter,
particularly silicates and is fed through conduit 8 with concentrated sulfuric acid at a rate of 2.05 metric tons per hour (calculated as 100% acid). The leaching stage 1 is also fed through conduits 9 and 13 with washing water from the washing unit 6, at a rate of 1.22 metric tons per hour, and with mother liquor from the pressure crystallization unit 2 at a rate of 3.45 metric tons per hour (0.65 metric ton magnesium sulfate and 2.8 metric tons water per hour). Additional water at a rate of 0.58 metric ton per hour is fed through conduit 27.

After a leaching treatment at 80° C for 2 hours, the slurry is neutralized with magnesia, and solids at a rate of 0.65 metric ton per hour are withdrawn through conduit 10, washed in the washing unit 6 with water at a rate of 1.22 metric tons per hour, and finally discharged through 26.

At a rate of 8 metric tons per hour (consisting of 3.04 metric tons magnesium sulfate and 4.96 metric tons water per hour) the solution is fed at 80° C through 12 into the pressure crystallization unit 2. At a temperature of 210° C, corresponding to a pressure of 18 kg/cm² above atmospheric pressure, water vapor-laden exhaust gases at a rate of 1.26 metric tons per hour are withdrawn through 12 and mother liquor at a rate of 3.45 metric tons per hour is withdrawn through 13. The filter residue obtained at a rate of 3.29 metric tons per hour is cooled to form hydrated magnesium sulfate at the same rate. The magnesium sulfate produced per hour consists of 2.39 metric tons of anhydrous magnesium sulfate and 0.9 metric ton of water of crystallization, corresponding to a content of 2.5 moles water of crystallization.

When the material has been ground to the fineness of 100% below 1 mm which is required in a fluidized bed, the material enters the decomposing unit 3, which consists of a suspension-type-heat-exchanger and a fluidized-bed reactor. Initially, in the suspension-type-heat-exchanger, the magnesium sulfate is dewatered and preheated by the exhaust gases from the fluidized-bed reactor, which are at 1130° C and by said treatment are cooled to 350° C. The pre-dewatered and heated magnesium sulfate then enters the fluidized-bed reactor, which is operated at 1130° C and is fed with air at a rate of 4000 standard cubic meters per hour, fuel oil at a rate of 0.45 metric ton per hour, and elementary sulfur at a rate of 23 kg/h. The air is used as fluidizing air and secondary air in equal parts. The magnesia which has been formed in the fluidized-bed reactor enters the fluidized-bed cooler 19, in which it is cooled to 130° C as it flows in a cross- and countercurrent to the fluidizing air and the air which is to be indirectly heated. The air streams leaving the fluidized-bed cooler have been heated therein to 400° C (fluidizing air) and 120° C (indirectly heated air) and are fed to the fluidized-bed reactor as secondary air and as fluidizing air.

Exhaust gases at 350° C leave the suspension-type-heat-exchanger stage of the decomposing unit 3 at a rate of 4500 standard cubic meters dry gas per hour and have the following composition by volume:
$N_2$: 71.5%
$CO_2$: 15.9%
$SO_2$: 10.5%
$O_2$: 2.1%

They flow through conduit 22 into a gas purifier 4, in which water is separated at a rate of 1.22 metric tons per hour. The water is recycled into the leaching stage 1 through conduit 24 and washing unit 6. The sulfur dioxide-containing, purified gas at 40° C is fed through 25 into the sulfuric acid plant 5, in which sulfuric acid is recovered at the rate of 2.05 metric tons per hour which is required in the leaching stage 1.

What is claimed is:

1. Process for producing magnesia from magnesium-containing carbonate ores which comprises:
    (a) leaching said ore with sulfuric acid;
    (b) neutralizing the solution from (a) with magnesia and separating undissolved impurities;
    (c) crystallizing magnesium sulfate from the solution from (b) under superatmospheric pressure and at temperatures above 150° C;
    (d) separating and cooling the magnesium sulfate crystals so that they contain 1.5–4 mols of water of crystallization and thereby have a crystal fineness suitable for decomposition in the fluidized bed reaction zone of step (f);
    (e) dehydrating and/or heating the crystals from (d) in a suspension-type heat-exchanger with exhaust gases from the fluidized-bed reaction zone of step (f);
    (f) feeding the crystals from (e) after separation to a fluidized bed reaction zone where they are decomposed to form magnesia and sulfur dioxide, the heat required for the decomposition reaction being generated by approximately a stoichiometric combustion of fuel charged into the fluidized bed reaction zone;
    (g) removing magnesia from the fluidized bed reaction zone and feeding same to a multi-stage fluidized-bed cooler operated with air as a fluidized gas;

(h) feeding fluidized air from the fluidized bed cooler to the fluidized bed reaction zone of step (f);

(i) converting the sulfur dioxide produced in step (f) into sulfuric acid and recycling same to leaching step (a).

2. Process of claim 1 wherein magnesium sulfate is decomposed in step (f) in an expanded fluidized bed having a mean fractional voidage of $\epsilon > 0.7$, the solids are separated in a recycling cyclone and a major portion of the solids are recycled into the fluidized bed reaction zone.

3. Process of claim 2 wherein a portion of the fluidizing air is fed to the reaction zone as secondary air above the inlet for the fluidizing air and fuel is charged to the reaction zone between the inlets for the fluidizing air and secondary air.

4. Process of claim 3 wherein the ratio of fluidizing air to secondary air is 1 : 2 to 5 : 1.

5. Process of claim 1 wherein sulfur losses in the process are compensated for by adding sulfur containing substances to the fluidized bed reaction zone.

* * * * *